United States Patent
Bega et al.

(10) Patent No.: US 12,542,837 B2
(45) Date of Patent: Feb. 3, 2026

(54) DEVICES AND METHODS FOR REQUESTS PREDICTION

(71) Applicant: Nokia Technologies Oy, Espoo (FI)

(72) Inventors: Dario Bega, Munich (DE); Anna Pantelidou, Massy (FR); Christiane Maria Allwang, Munich (DE)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 18/559,114

(22) PCT Filed: Aug. 31, 2021

(86) PCT No.: PCT/EP2021/073965
§ 371 (c)(1),
(2) Date: Nov. 6, 2023

(87) PCT Pub. No.: WO2023/030608
PCT Pub. Date: Mar. 9, 2023

(65) Prior Publication Data
US 2024/0236208 A1    Jul. 11, 2024

(51) Int. Cl.
*G06F 15/16* (2006.01)
*H04L 41/147* (2022.01)
*H04L 41/16* (2022.01)
*H04L 67/62* (2022.01)

(52) U.S. Cl.
CPC ............ *H04L 67/62* (2022.05); *H04L 41/147* (2013.01); *H04L 41/16* (2013.01)

(58) Field of Classification Search
CPC ... H04L 41/147; H04L 41/16; H04L 41/5054; H04L 67/62; H04L 43/16; H04L 47/83
See application file for complete search history.

(56) References Cited

U.S. PATENT DOCUMENTS

| | | | |
|---|---|---|---|
| 10,970,629 B1* | 4/2021 | Dirac | G06N 7/01 |
| 11,258,847 B1* | 2/2022 | Rhodes | H04L 67/1001 |
| 11,388,244 B1* | 7/2022 | Ni | H04L 67/01 |
| 2010/0229174 A1* | 9/2010 | Mukherjee | G06F 9/52 718/103 |
| 2015/0172134 A1* | 6/2015 | Yanacek | G06F 15/173 709/223 |

(Continued)

FOREIGN PATENT DOCUMENTS

EP    3836037 A1    6/2021

OTHER PUBLICATIONS

"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320, V16.4.0, Mar. 2021, pp. 1-35.

(Continued)

*Primary Examiner* — Suraj M Joshi
*Assistant Examiner* — Hao H Nguyen
(74) *Attorney, Agent, or Firm* — Barta Jones, PLLC

(57) ABSTRACT

A requests prediction apparatus (103) comprising means for: —generating information related to one or more predicted data service requests on the basis of information related to one or more past data service requests; —sending information related to at least one of the predicted data service requests to a requests prediction service client (102-*i*).

9 Claims, 9 Drawing Sheets

(56) References Cited

U.S. PATENT DOCUMENTS

| | | | | |
|---|---|---|---|---|
| 2017/0316334 | A1* | 11/2017 | Srivastava | G06N 7/01 |
| 2019/0129599 | A1* | 5/2019 | Manthina | G06Q 10/20 |
| 2020/0219070 | A1* | 7/2020 | Rosenzweig | G07C 5/008 |
| 2020/0358689 | A1* | 11/2020 | Lee | H04L 43/0817 |
| 2021/0136178 | A1* | 5/2021 | Casey | H04L 67/60 |
| 2021/0241177 | A1* | 8/2021 | Wang | G06N 5/04 |
| 2021/0335135 | A1* | 10/2021 | Lauer | H04L 67/12 |
| 2021/0397392 | A1* | 12/2021 | Adachi | G06F 11/3013 |
| 2022/0253690 | A1* | 8/2022 | Sinha | G06N 3/044 |
| 2022/0382857 | A1* | 12/2022 | Liu | G06F 21/552 |
| 2023/0007092 | A1* | 1/2023 | Singh | H04L 67/025 |
| 2023/0217304 | A1* | 7/2023 | Singh | H04W 72/21 |
| | | | | 370/329 |
| 2024/0073709 | A1* | 2/2024 | Karampatsis | H04W 24/02 |

OTHER PUBLICATIONS

"3rd Generation Partnership Project; Technical Specification Group Services and System Aspects; Telecommunication management; Subscriber and equipment trace; Trace control and configuration management (Release 17)", 3GPP TS 32.422, V17.2.0, Mar. 2021, pp. 1-223.

"3rd Generation Partnership Project; Technical Specification Group Services and System Aspects; Architecture enhancements for 5G System (5GS) to support network data analytics services (Release 17)", 3GPP TS 23.288, V17.0.0, Mar. 2021, pp. 1-159.

"3rd Generation Partnership Project; Technical Specification Group Services and System Aspects; Telecommunication management; Generic Network Resource Model (NRM Integration Reference Point (IRP); Information Service (IS (Release 16)", 3GPP TS 28.622, V16.7.1, Apr. 2021, pp. 1-54.

"3rd Generation Partnership Project; Technical Specification Group Services and System Aspects; Management and orchestration; Performance assurance (Release 16)", 3GPP TS 28.550, V16.7.0, Dec. 2020, pp. 1-85.

"3rd Generation Partnership Project; Technical Specification Group Services and System Aspects; Management and orchestration; Generic management services; (Release 16)", 3GPP TS 28.532, V16.7.1, Apr. 2021, 222 pages.

"IEEE 802.16", Wikipedia, Retrieved on Oct. 10, 2023, Webpage available at : https://en.wikipedia.org/wiki/IEEE_802.16.

International Search Report and Written Opinion received for corresponding Patent Cooperation Treaty Application No. PCT/EP2021/073965, dated May 6, 2022, 13 pages.

Golshani et al., "Proactive auto-scaling for cloud environments using temporal convolutional neural networks", Journal of Parallel and Distributed Computing, vol. 154, Aug. 2021, pp. 119-141.

"3rd Generation Partnership Project; Technical Specification Group Services and System Aspects; Study of Enablers for Network Automation for the 5G System (5GS); Phase 3 (Release 18)", 3GPP TR 23.700-81, V18.0.0, Dec. 2022, pp. 1-278.

* cited by examiner

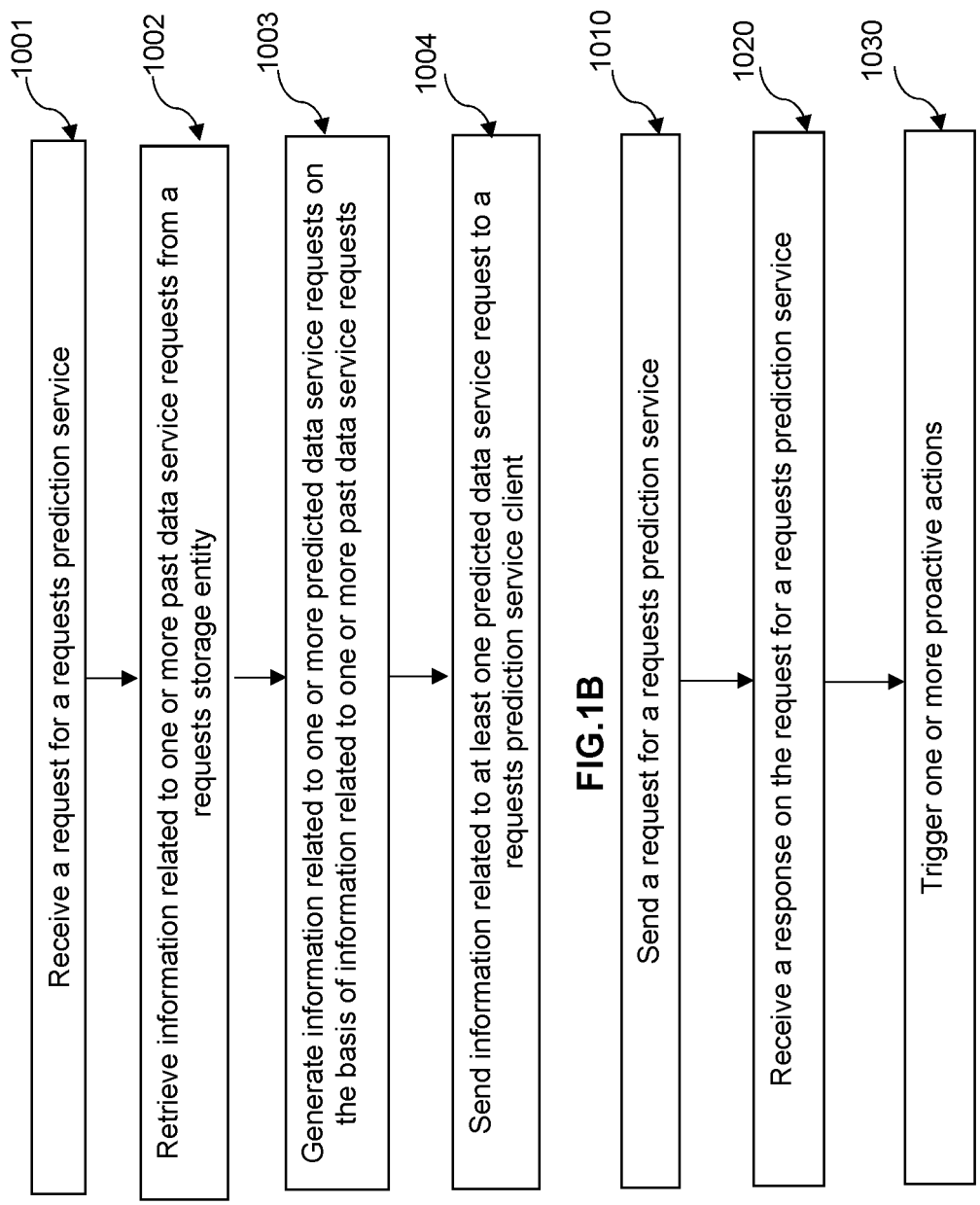

DEVICES AND METHODS FOR REQUESTS PREDICTION

RELATED APPLICATION

This application claims priority to PCT Application No. PCT/EP2021/073965, filed on Aug. 31, 2021, which is incorporated herein by reference in its entirety.

TECHNICAL FIELD

Various example embodiments related generally to devices, methods, and computer program products for requests prediction in a telecommunication network.

BACKGROUND

A telecommunication network is a system designed to transfer data from a network entity to one or more network entities. Data transfer involves data collection, data switching, transmission media, and system controls in addition to hardware and/or software resources that need to be deployed for data storage and/or processing.

Data collection in a telecommunication network is defined according to a service-oriented approach described as an interaction between a data consumer and a data provider. The data consumer requests data from the data provider when the data consumer needs data to perform a given task. For example, the data consumer needs data when it receives a request for a given service and requires data to perform one or more tasks in order to provide the requested service. If the required data is not available at the data consumer, the data consumer activates data collection to collect the required data from one or more data providers. Accordingly, the data consumer activates the collection of data only after receiving the request for a given service for which data is needed.

Requesting the provision of data only when data is needed to perform a given task is a sub-optimal approach in particular when data is needed to perform a real-time task that does not support the delays induced by the data collection process. For instance, such an approach is sub-optimal when data is needed to perform tasks based on AI/ML (Artificial Intelligence/Machine Learning) algorithms and models. Indeed, performing AI/ML-based tasks requires training data to train the AI/ML models and algorithms prior to their use and requires input data to run the trained AI/ML models to provide the requested service. Since the training of AI/ML algorithms requires a huge amount of training data to perform the training task, activating training data collection only when training data is required introduces a time delay in the training process. Furthermore, collecting enough training data may require a long time period. The introduced delay will be then added up to the time required to complete the training process.

A possible approach to reduce the delay of waiting for the data collection process consists in performing data collection continuously such that data can be available when needed. This strategy is not applicable in real telecommunication networks since it introduces a high network overload.

There is accordingly a need for enhanced techniques for data provision and collection in telecommunication networks.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, there is provided a requests prediction apparatus comprising means for:
generating information related to one or more predicted data service requests on the basis of information related to one or more past data service requests;
sending information related to at least one of the predicted data service requests to a requests prediction service client.

In an embodiment, the one or more past data service requests correspond to one or more requests received, at one or more previous time intervals, by one or more requests prediction service clients, the one or more predicted data service requests corresponding to one or more requests that may be received, at a future time interval, by the requests prediction service client.

In an embodiment, the means for generating the information related to the one or more predicted data service requests are configured to process the information related to the one or more past data service requests using an artificial intelligence/machine learning algorithm.

In an embodiment, the requests prediction apparatus further comprises means for training the artificial intelligence/machine learning algorithm using as training data at least a part of the information related to the one or more past data service requests.

In an embodiment, the requests prediction apparatus further comprises means for generating a probability value in association with a predicted data service request, the probability value representing a probability of receiving the predicted data service request at a future time interval.

In an embodiment, the requests prediction apparatus further comprises:
means for receiving a request for a requests prediction service from the requests prediction service client, the request for a requests prediction service comprising a probability threshold and a future time interval;
means for sending a response on the request for a requests prediction service to the requests prediction service client, the response comprising the information related to the at least one predicted data service request associated with a probability value that is higher than the probability threshold.

In an embodiment, the requests prediction apparatus further comprises:
means for generating predicted values from values of data obtained using one or more past data service requests;
means for determining whether one or more trigger criteria are met based on the predicted values;
means for sending trigger information including information related to the data for which the one or more trigger criteria are met to the requests prediction service client.

In a second aspect, there is provided a prediction service client apparatus comprising means for:
sending a request for a requests prediction service to a requests predictor;
receiving, from a requests predictor, a response on the request for the requests prediction service, the response comprising information related to at least one predicted data service request, the information being generated on the basis of information related to one or more past data service requests.

In an embodiment, the prediction service client apparatus comprises means for triggering one or more proactive actions depending on the information related to the at least one predicted data service request.

In an embodiment, the one or more proactive actions comprise proactive data collection, the prediction service client apparatus comprising means for training an artificial intelligence/machine learning algorithm using as training data the data collected during the proactive data collection.

In an embodiment, the prediction service client apparatus further comprises means for receiving, from the requests predictor, trigger information including information related to data for which one or more trigger criteria based on predicted values are met, the predicted values being generated from values of data obtained using one or more past data service requests, the means for triggering one or more proactive actions being configured to be activated after receipt of the trigger information.

In an embodiment, the information related to at least one predicted data service request comprises at least one of an indication on a requesting entity expected to send the at least one predicted data service request, an indication on a type of the at least one predicted data service request, one or more parameters associated with the predicted data service, and a probability value associated with the at least one predicted service request, a parameter of the predicted data service request.

In an embodiment, the information related to a past data service request comprises at least one of an indication on a requesting entity that has sent the past data service request, an indication on the past time interval during which the past data service request has been received, an indication on a type of the past data service request, and a parameter of the past data service request.

In a third aspect, there is provided a method for performing a requests prediction service, comprising:
  generating information related to one or more predicted data service requests on the basis of information related to one or more past data service requests;
  sending information related to at least one predicted data service request to a requests prediction service client.

Generally, the requests prediction apparatus comprises means for performing one or more or all steps of a method for performing requests prediction service as disclosed herein. The means may include circuitry configured to perform one or more or all steps of the method for performing a requests prediction service as disclosed herein. The means may include at least one processor and at least one memory including computer program code, wherein the at least one memory and the computer program code are configured to, with the at least one processor, cause the requests prediction apparatus to perform one or more or all steps of the method for performing a requests prediction service as disclosed herein.

In a fourth aspect, there is provided a non-transitory computer-readable medium storing computer-executable instructions that, when executed by at least one processor at the requests prediction apparatus, cause the requests prediction apparatus to perform a method for performing a requests prediction service as disclosed herein.

Generally, the computer-executable instructions cause the apparatus to perform one or more or all steps of the method for performing a requests prediction service as disclosed herein.

In a fifth aspect, there is provided a method for performing proactive actions, comprising:
  sending a request for a requests prediction service;
  receiving a response on the request for a requests prediction service, the response comprising information related to at least one predicted data service requests generated on the basis of information related to one or more past data service requests;
  triggering one or more proactive actions based on the information related to the one or more predicted data service requests.

Generally, the prediction service client apparatus comprises means for performing one or more or all steps of the method for performing proactive actions as disclosed herein. The means may include circuitry configured to perform one or more or all steps of the method for performing proactive actions as disclosed herein. The means may include at least one processor and at least one memory including computer program code, wherein the at least one memory and the computer program code are configured to, with the at least one processor, cause the requests prediction apparatus to perform one or more or all steps of the method for performing proactive actions as disclosed herein.

In a sixth aspect, there is provided a non-transitory computer-readable medium storing computer-executable instructions that, when executed by at least one processor at the requests prediction apparatus, cause the prediction service client apparatus to perform a method for performing proactive actions as disclosed herein.

Generally, the computer-executable instructions cause the apparatus to perform one or more or all steps of the method for performing proactive actions as disclosed herein.

In a seventh aspect, there is provided a requests prediction apparatus comprising at least one processor and at least one memory including computer program code. The at least one memory and the computer program code are configured to, with the at least one processor, cause the requests prediction apparatus to:
  generate information related to one or more predicted data service requests on the basis of information related to one or more past data service requests;
  send information related to at least one of the predicted data service requests to a requests prediction service client.

In an eighth aspect, there is provided a prediction service client apparatus comprising at least one processor and at least one memory including computer program code. The at least one memory and the computer program code are configured to, with the at least one processor, cause the prediction service client to:
  sending a request for a requests prediction service to a requests predictor;
  receiving, from a requests predictor, a response on the request for the requests prediction service, the response comprising information related to at least one predicted data service request, the information being generated on the basis of information related to one or more past data service requests.

BRIEF DESCRIPTION OF THE DRAWINGS

The accompanying drawings, which are incorporated in and constitute a part of this specification, illustrate example embodiments together with the general description given above, and the detailed description given below.

FIG. 1B is a flowchart depicting a method for providing a requests prediction service, according to some embodiments.

FIG. 1C is a flowchart depicting a method for activating consuming a requests prediction service, according to some embodiments.

Figure 1A:
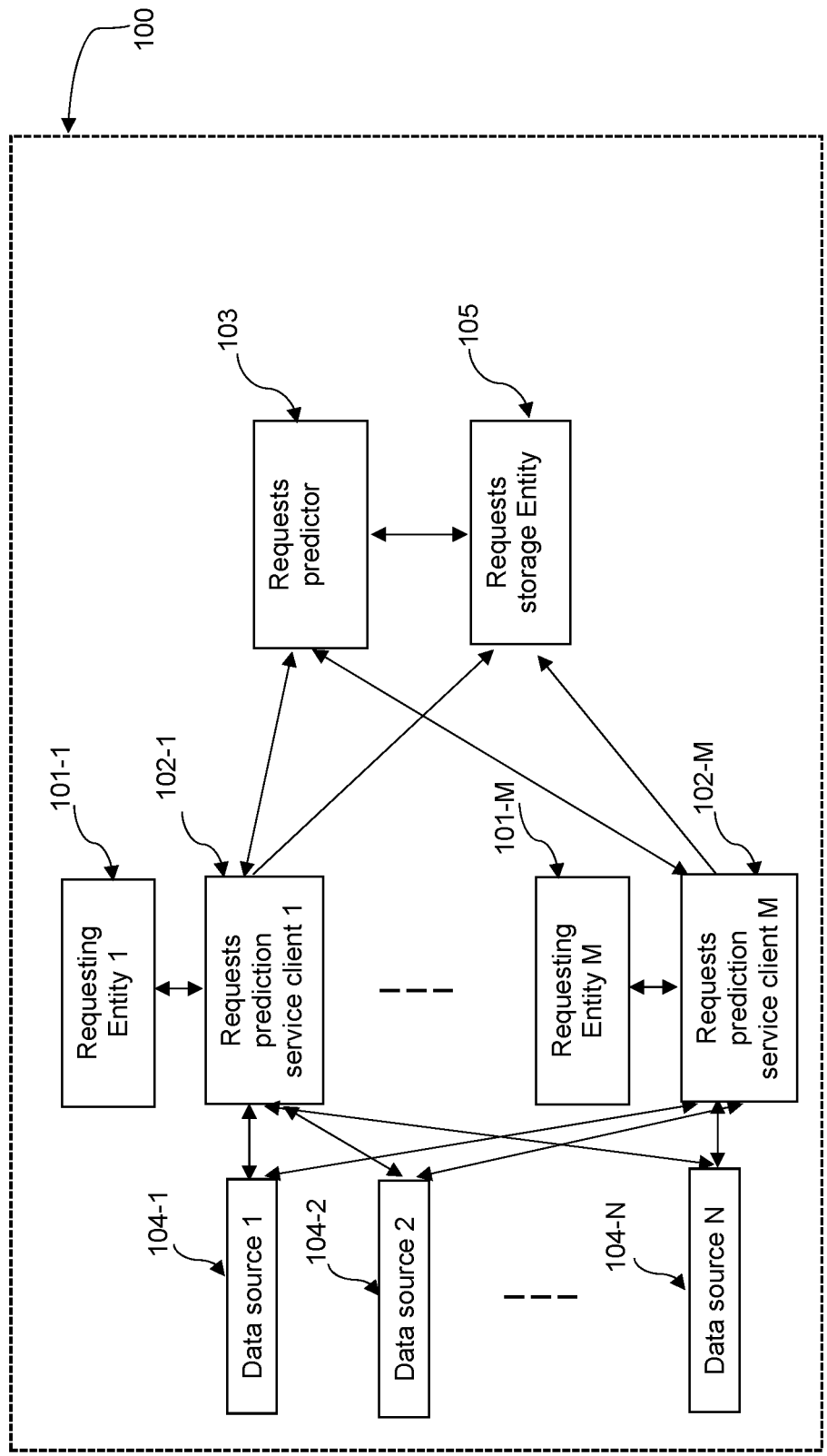
FIG. 1A is a block diagram illustrating an exemplary telecommunication network implementing a requests predictor, according to some embodiments.

It should be noted that these figures are intended to illustrate the general characteristics of devices, methods, and structures utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the present disclosure, two types of services are considered.

The first type of service is a data service (also referred to as a 'service') involving a data service consumer (also referred to as a 'requesting entity') and a data service provider (also referred to as a 'requested entity' or 'service producer'). The requesting entity triggers a data service from the requested entity by sending a request for a data service (also referred to as a 'data service request' or simply a 'request') to the requested entity. The data service request designates any type of request that involves the generation and/or the collection of data (e.g. raw data and/or processed data) by the requested entity to perform the tasks required to provide the requested service.

Raw data designates data that is in its initial state as collected from its data source, i.e. it has not been yet processed or organized or visually presented. Raw data may be provided from a variety of data sources comprising, without limitation, databases, files, spreadsheets, cameras, user equipments, network entities (e.g. base stations) and sensors.

Processed data designates data that has been converted or processed in any manner or transformed into information useful for further analysis and/or decision-making.

Exemplary types of raw and/or processed data comprise, without limitation, network data, user data, subscription data, control data, security data, and activity data.

Examples of raw and/or processed data comprise measurements data (e.g. sensor measurements, user equipment measurements, network measurements, channel state measurements, quality of service measurements, performance measurements).

Examples of processed data comprise statistical data such as analytics data.

The second type of service is a requests prediction service involving a requests prediction service client (also referred to as a 'prediction service client') and a requests prediction service provider (also referred to as a 'requests predictor' or 'prediction service provider'). The requests prediction service client is the requested entity with respect to the first type of service. The requests prediction service client triggers the requests prediction service from the requests predictor in order to receive a prediction on the requests it is expected to receive in the future from one or more requesting entities.

A past request (also referred to as a 'historical request') designates a data service request received by the prediction service client from a requesting entity at a past (also referred to as a 'previous') time interval. The past data service designates a past service that has been provided by the requests prediction service client and involved the generation of past data by the requests prediction service client.

A future request (also referred to as an 'incoming request' or 'predicted request') designates a data service request that is expected to be received by the prediction service client from a requesting entity at a future time interval. The predicted data service identifies a future data service expected to be provided by the requests prediction service client and to involve the generation of predicted data by the requests prediction service client.

The requests predictor predicts the future requests expected to be received by the prediction service client on the basis of information related to the past requests received by the prediction service client at one or more past time intervals. The future requests are adapted to trigger proactive data collection.

In an embodiment, the values of the data (whether raw data or processed data) obtained based on past requests may also be used to trigger proactive data collection. One or more trigger criteria may be defined based on the values of the data obtained using past requests. For example, one or more trigger criteria may be defined on the basis of statistics for one or more parameters having high values (e.g. any network parameter related to an area with rare activity or very low traffic), or one or more parameters related to unusual behavior or one or more parameters characterizing anomalies. The requests predictor may for example be configured to perform a data values prediction service to generate predicted values and/or to compute statistical values of one or more parameters of interest based on values of the data obtained using one or more past requests. The generation of the predicted values may be performed using an artificial intelligence/machine learning model. The requests predictor may be configured to determine whether the one or more trigger criteria are met based on values of the data obtained using one or more past requests, e.g. by determining whether a collected data value or a predicted value or a statistical value is above, or respectively below, a threshold. Proactive data collection may be triggered if the one or more trigger criteria are met. The requests predictor may for example be configured to send, to the prediction service client, trigger information to cause proactive data collection if the one or more trigger criteria are met. The trigger information may for example include information related to data obtained using one or more past requests for which the one or more criteria are met (whether by the collected data value or a predicted value or a statistical value), for example information related to the data whose predicted value(s) meet(s) a trigger criteria or information related to the predicted values meeting a trigger criteria. The trigger information may for example include information related to predicted requests adapted to trigger proactive data collection. It is to be noted that the generation of information related to predicted requests based on data values obtained using past requests may be used independently on the requests prediction service or in combination with the requests prediction service to generate further information related to predicted requests in addition to the information related to predicted requests generated by the requests prediction service.

The requests prediction service enables the prediction service client having a prediction on the future requests that it is expected to receive at one or more future time intervals from one or more requesting entities. By having requests prediction, the prediction service client can proactively trigger one or more actions to prepare the resources it will need to perform the tasks required to provide the data service to the requesting entity when the prediction service client effectively receives the data service request. The prediction service client can thus anticipate and prepare the necessary resources to make them available and ready for use when needed.

In an embodiment in which the data service request involves the collection of data, the prediction service client acts as a data collector and performs proactive data collection from one or more data sources to collect data it will need to provide the requested data service.

In an embodiment in which the data service request involves the production of data, the prediction service client acts as a data producer and performs data production/generation. If data production requires raw and/or processed data that is not available at the prediction service client, the prediction service client acts in addition as a data collector and performs proactive data collection from one or more data sources.

By triggering data collection proactively, the prediction service client reduces the delay between the receipt of a data service request and obtaining the results of the data collection performed on the basis of the data service request. Further, the prediction service client has the resources ready for use when it effectively receives the data service request from the requesting entity.

FIG. 1A illustrates an exemplary telecommunication network 100 in which exemplary embodiments may be implemented.

The telecommunication network 100 may be a digital system part of a communication system, a data processing system, or a data storage system. Exemplary digital systems comprise, without limitations:

communication systems (e.g. radio communication systems, wireless communication systems, optical fiber-based communication systems, optical wireless communication systems, satellite communication systems);
storage systems (e.g. cloud computing systems);
programming systems (e.g. computing systems, quantum computing systems);
positioning systems.

According to some embodiments, the telecommunication network 100 may be:

wired (e.g. optical fiber-based networks);
wireless (e.g. radio communication networks);
acoustic (e.g. underwater acoustic communication systems);
molecular (used for example in underground structures such as tunnels and pipelines).

In an exemplary application to wired networks, the telecommunication network 100 may be a computer networking system in which one or more data sources 104-$j$ are configured to operate in a wired network. Exemplary data sources 104-$j$ adapted to such applications comprise computers, routers or switches connected to a small or large area wired network. Any type of physical cable may be used in such wired data network to ensure the transfer of data between the devices connected to the wired network comprising the one or more network data sources 104-$j$.

In another application to wireless networks, the telecommunication network 100 may be any wireless network involving any type of wireless propagation medium suitable for this type of connectivity. Exemplary wireless communication networks comprise, without limitation, ad-hoc wireless networks used in local area communications, wireless sensor networks, and radio communication networks (e.g. Long Term Evolution or LTE, LTE-advanced, 3G/4G/5G and beyond). In such applications, the one or more data sources 104-$j$ may be any type of fixed or mobile wireless device/system/object configured to operate in a wireless environment. The one or more data sources 104-$j$ may be remotely monitored and/or controlled. The one or more data sources 104-$j$ may be equipped with one or more transmit antennas and one or more receive antennas.

According to some embodiments in application to wireless networks, the data sources 104-$j$ comprise, without limitations:

user equipments (e.g. laptops, tablets, mobile phones, robots, Internet of Things (IoT) devices);
base stations (e.g. cellular base stations like eNodeB in LTE and LTE-advanced networks and gNodeB used in 5G networks, and femtocells used at homes or at business centers);
control stations (e.g. radio network controllers, base station controllers, network switching sub-systems);

network management systems responsible of the management and orchestration of the network elements operable in the telecommunication network 100.

Exemplary applications to wireless networks comprise:
Machine-To-Machine (M2M);
Device-To-Device (D2D);
Industry 4.0;
IoT (for example vehicle-to-everything communications) involving networks of physical devices, machines, vehicles, home alliances and many other objects connected to each other and provided with a connectivity to the Internet and the ability to collect and exchange data without requiring human-to-human or human-to-computer interactions.

In exemplary IoT applications, the telecommunication network 100 may be a wireless IoT network representing low energy power-consumption/long battery life/low-latency/low hardware and operating cost/high connection density constraints such as low-power wide area networks and low-power short-range IoT networks. The telecommunication network 100 may be any wireless network enabling IoT in licensed or license-free spectrum.

Exemplary wireless technologies used in IoT applications may comprise:
short range wireless networks (e.g. Bluetooth mesh networking, Light-Fidelity, Wi-Fi™, and Near-Field communications);
medium range wireless networks (e.g. LTE-advanced, Long Term Evolution-Narrow Band, NarrowBand IoT), and
long range wireless networks (e.g. Low-Power Wide Area Networks (LPWANs), Very small aperture terminal, and long-range Wi-Fi™ connectivity).

Exemplary applications of M2M and IoT applications comprise, without limitation:
consumer applications (e.g. Internet of Vehicles, home automation, smart cities, wearable technologies, and connected health), and
commercial applications (e.g. digitalized healthcare connecting medical resources and healthcare services in which special monitors and sensors may be used to enable remote health monitoring and emergency notifications, smart traffic control, and road assistance).

According to some embodiments in application to wireless data networks, the one or more data sources 104-*j* are any physical system/device/object provided with the required hardware and/or software technologies enabling wireless communications and transfer of data or operational signals or messages to one or more entity in the telecommunication network 100.

In another application to optical fiber networks, the telecommunication network 100 may be any data network in which any optical fiber link is designed to carry data over short or long distances. Exemplary applications using optical fiber links over short distances comprise high-capacity networks such as data center interconnections. Exemplary applications using optical fiber links over long distances comprise terrestrial and transoceanic transmissions. In such applications, network data generated by the network elements operable in the telecommunication network 100 may be carried by optical signals polarized according to the different polarization states of the optical fiber. The optical signals propagate along the fiber-based link according to one or more propagation modes.

Exemplary applications of optical fiber data networks comprise, without limitation, aerospace and avionics, data storage (e.g. in cloud computing systems, automotive, industry, and transportation). Such applications may involve transfer of voice (e.g. in telephony), data (e.g. data supply to homes and offices known as fiber to the home), images or video (e.g. transfer of internet traffic), or connection of networks (e.g. connection of switches or routers and data center connectivity in high-speed local area networks). In such applications, the one or more data sources 104-*j* may be any optical line terminal integrated for example at the provider's central office or an optical network terminal deployed at the customer premises.

In another application to hybrid networks, the telecommunication network 100 may comprise wireless and optical connectivities between the network elements operable in the telecommunication network 100. For example, the telecommunication network 100 may be a hybrid optical-wireless access network in which a wireless base station sends data to a wireless gateway through an optical network unit. An exemplary architecture of a hybrid optical-wireless network comprises an integration of Ethernet Passive Optical Networks and wireless broadband communications based on WiMax (Worldwide Interoperability for Microwave Access) standardized in the IEEE 802.16 standards for access networks. In such applications, the one or more data sources 104-*j* may be any optical line terminal or optical network unit or any wireless device/system/sub-system/object.

In another application to optical wireless data networks, connectivity between the entities operable in the telecommunication network 100 may use optical communication in which unguided visible, infrared, or ultraviolet light is used to carry the signals carrying exchanged data (including network-related data and reports on network-related events). Exemplary optical wireless communications technologies comprise visible light communications (VLC), free space optics (FSO) and optical camera communications (OCC). Exemplary applications of optical wireless data networks comprise Optical Internet of Things supported by 5G networks.

The data sources 104-*j* are configured to provide data to the prediction service clients 102-*i*, for i varying from 1 to M. The data sources 104-*j*, for j varying from 1 to N, may be any entity operable in the telecommunication network, providing data that may be of any type.

The telecommunication network 100 comprises one or more requesting entities 101-*i* and one or more requests prediction service entities 102-*i*, with i varying from 1 to M and designating the total number of requests prediction service entities.

In the telecommunication network 100:
the prediction service client 102-*i* communicates with the requesting entity 101-*i* for the operations related to the data service, for i varying from 1 to M. The operations related to the data service comprise sending data service requests by the requesting entity 101-*i* to the prediction service client 102-*i* and sending a response on the data service request by the prediction service client 102-*i* to the requesting entity 101-*i*;
the prediction service client 102-*i* communicates with the requests predictor 103 for the operations related to the requests prediction service, for i varying from 1 to M. The operations related to the requests prediction service comprise sending a request for requests prediction service by the prediction service client 102-*i* to the requests predictor 103 and sending a response on the requests for requests prediction service from the requests predictor 103 to the prediction service clients 102-*i*;

the prediction service client 102-*i* communicates with one or more data sources 104-*j* for the operations related to proactive data collection, for i varying from 1 to M and j varying from 1 to N, with N being the total number of data sources;

the prediction service client 102-*i*, for i varying from 1 to M, communicates with a requests storage entity 105 for operations related to the storage of the received data service requests, and the requests predictor 103 communicates with the requests storage entity 105 for operations related to the retrieval of information related to past requests that are stored in the requests storage entity 105.

The past requests received by the one or more prediction service clients 102-*i* from the one or more requesting entities 101-*i* may be stored regularly (e.g. at periodic time interval) or immediately in the requests storage entity 105. The prediction service clients 102-*i* may be configured to send, at specific time intervals or after reception of a new data service request, a request for storing the information related to the data service requests they have received during each specific time interval.

In the telecommunication network 100, the requests predictor 103 provides the requests prediction service to the one or more prediction service clients 102-*i*, with i varying from 1 to M. More specifically, for each requests prediction service activated by a prediction service client 102-*i*, the requests predictor 103 is configured to:

generate information related to one or more predicted requests on the basis of information related to one or more past requests;

select one or more predicted requests according to a requests selection criterion; and send information related to the one or more selected predicted requests to the prediction service client 102-*i*.

A predicted request corresponds to a predicted data service expected to be received by the requests prediction service client 102-*i* and expected to involve data generation by the requests prediction service client 102-*i*.

In an embodiment, the requests predictor 103 is configured to provide predictions on the values of data expected to be generated by the requests prediction service client 102-*i* when receiving the predicted request. In this embodiment, the requests predictor 103 is configured to:

generate predicted values of the predicted data;

generate information related to predicted values on the basis of information related to past data values generated by the requests prediction service client 102-*i* in past time intervals in response to the past data service requests;

select, among the predicted values, a set of predicted values exceeding one or more data value thresholds;

send information related to the selected set of predicted data to the prediction service client 102-*i*, i.e. send information related to the predicted data of predicted values exceeding the one or more data value thresholds of the requests prediction service client 102-*i*.

Exemplary embodiments enable activating and de-activating the requests prediction service.

Exemplary embodiments enable collecting information related to past requests received in the telecommunication network 100.

Exemplary embodiments enable storing information related to past requests received in the telecommunication network 100.

Exemplary embodiments enable collecting information related to past requests for raw data, past requests for statistical data, and past requests for data collection, received in the telecommunication network 100.

Exemplary embodiments enable providing predictions on incoming requests in a telecommunication network based on statistical information learned from the collected past requests received in the telecommunication network 100.

Exemplary embodiments enable providing predictions on the type of future incoming requests in the telecommunication network 100. In particular, exemplary embodiments enable providing predictions on future incoming requests for raw data, future incoming requests for processed data, and future incoming requests for data collection.

Exemplary embodiments enable predicting values of future predicted data in the telecommunication network 100.

Exemplary embodiments enable triggering proactive actions depending on the predictions provided by the requests prediction service.

Exemplary embodiments enable proactive data provision and proactive data collection to have data available and ready as soon as required to perform a given task for which data is required.

Exemplary embodiments enable proactive training data collection and proactive training of AI/ML models and algorithms to have the AI/ML models ready as soon as required to perform a given AI/ML-based tasks.

FIG. 1B is a flowchart depicting a method for providing a requests prediction service by the requests predictor 103, according to some embodiments. The method comprises:

receiving, at step 1001, a request for a requests prediction service from a requests prediction service client 102-*i*;

retrieving, at step 1002, information related to one or more past data service requests from the requests storage entity 105;

generating, at step 1003, information related to one or more predicted data service prediction requests on the basis of information related to one or more past data service requests, and sending, at step 1004, information related to at least one predicted data service request to the requests prediction service client 102-*i*.

FIG. 1C is a flowchart depicting a method for consuming a requests prediction service by a requests prediction service client 102-*i*, according to some embodiments. The method comprises:

sending, at step 1010, a request for a request prediction service to the requests predictor 103;

receiving, at step 1020, a response on the request for a requests prediction service from the requests predictor 103, the response comprising information related to at least one predicted data service request, the information being generated on the basis of information related to one or more past data service requests, and triggering one or more proactive actions depending on the information related to at least one predicted data service request.

Figure 2:
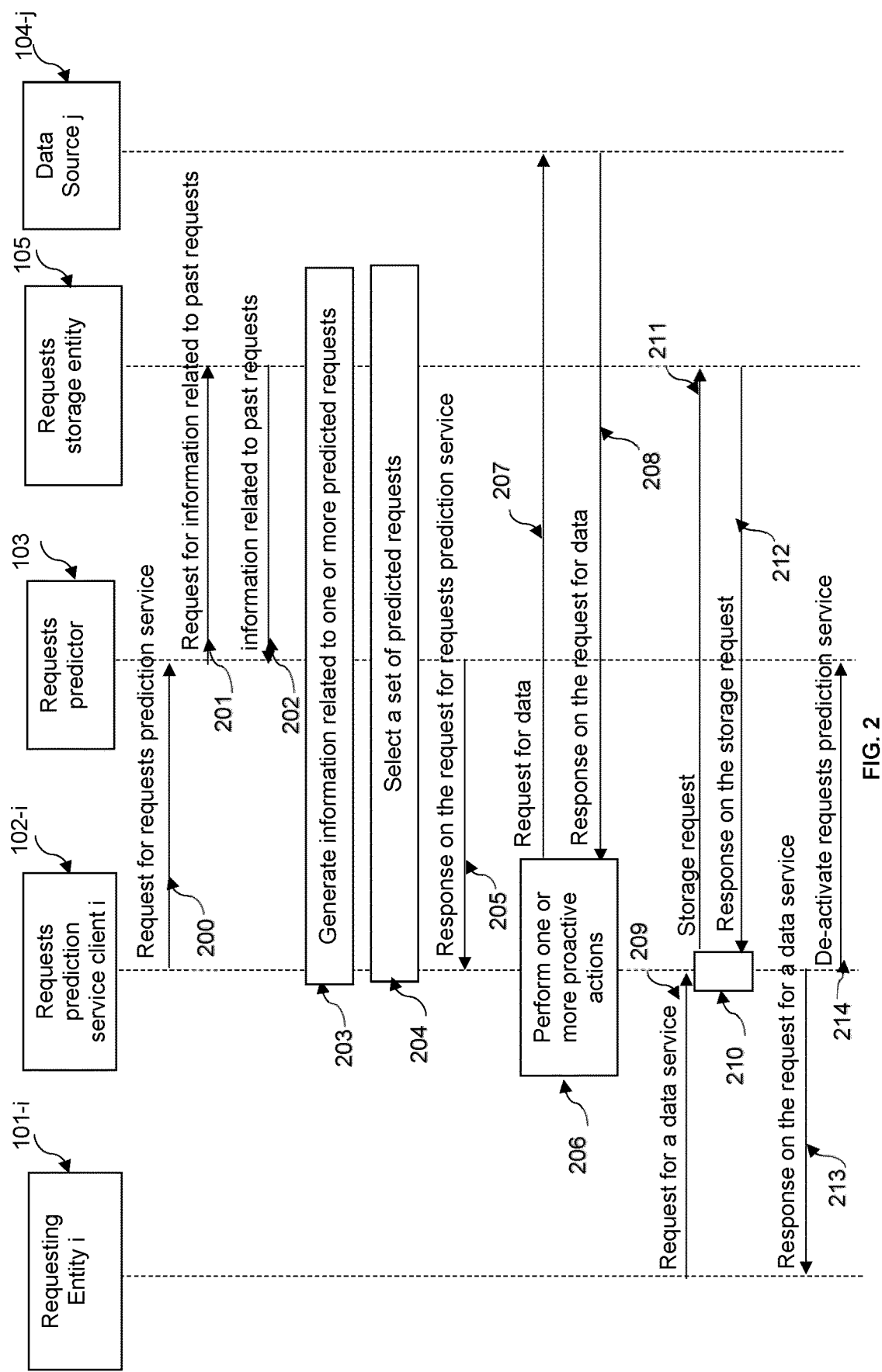
FIG. 2 is a connection flow illustrating an exemplary implementation of a requests prediction service, according to some embodiments.

FIG. 2 is a connection flow illustrating an exemplary implementation of the requests prediction service, according to some embodiments in which a prediction service client 102-*i* activates a requests prediction service from the requests predictor 103 to have predictions on future requests it is expected to receive from a requesting entity 101-*i*.

The prediction service client 102-*i* triggers the requests prediction service from the requests predictor 103 by sending, at step 200, a request for a requests prediction service to the requests predictor 103. The prediction service client 102-*i* triggers the requests prediction service to anticipate one or more future data service requests it is expected to receive at one or more future time intervals from the requesting entity 101-$i$ with a probability higher than a threshold.

Accordingly, the request for a requests prediction service comprises one or more probability thresholds and one or more future time intervals to specify to the requests predictor 103 that the requested predictions concern:
- the requesting entity 101-$i$;
- the future incoming data service requests that are expected to be received from the requesting entity 101-$i$ at the one or more future time intervals;
- the future incoming data service requests that are expected to be received from the requesting entity 101-$i$ with a probability value that is higher than a probability threshold among the one or more probability thresholds.

In an embodiment, the request for requests prediction service further comprises one or more data value thresholds to activate the data values prediction service and specify to the requests predictor 103 that data values predictions concern the data values that exceed a data value threshold among the one or more data value thresholds.

Upon receiving the request for the requests prediction service, the requests predictor 103 retrieves, from the requests storage entity, information related to the past requests received in the telecommunication network 100 by the one or more prediction service clients 102-$i$, with $i$ varying from 1 to M, at one or more previous time intervals. This means that the requests predictor 103 retrieves not only the information related to the past requests received by the prediction service client 102-$i$, but the information related to the past requests received in the telecommunication network 100 by all of the one or more prediction service client 102-$i$ with $i$ taking value from 1 to M.

To do so, the requests predictor 103 sends, at step 201, a request for information related to past requests to the requests storage entity 105 and receives, at step 202, information related to one or more past requests received by the one or more prediction service clients 102-$i$ at one or more previous time intervals, with $i$ varying from 1 to M.

In an embodiment, the request for information related to past requests comprises a request for information related to past data values. In this embodiment, the requests predictor 103 receives, at step 202, information related to past data values.

In an exemplary embodiment, the information related to a past request comprises at least one of an indication on the requesting entity 101-$i$ that has sent the past request, an indication of the prediction service client 102-$i$ that has received the past request, an indication on the past time interval during which the past request has been received, an indication on the type of the past request (for example a request for raw data or a request for data analytics), one or more parameters of a past request, one or more parameters of a target entity having received and processed the past request.

Upon receiving the information related to the one or more past requests, the requests predictor 103 generates, at step 203, information related to one or more predicted requests on the basis of the information related to the one or more past requests. A predicted request corresponds to a request that is expected to be received by the prediction service client 102-$i$ at a future time interval among the one or more future time intervals comprised in the request for requests prediction service.

In an exemplary embodiment, the requests predictor 103 is configured to generate the information related to the one or more predicted requests by processing the information related to the one or more past requests using an artificial intelligence/machine learning algorithm.

In an exemplary embodiment, the artificial intelligence/machine learning algorithm is a supervised machine learning algorithm configured to generate output data from input data. For example, the input data comprise at least one of indications on the past time intervals during which the one or more past requests have been received, indications on the number of a particular requests received at a specific time window, indications on the types of the one or more past requests, indication on data type of the one or more past requests received from several requesting entities, and indication on the load of the telecommunication network 100. For example, the output data comprise at least one of indications on time stamp related to one or more predicted requests, indication on data type of one or more predicted requests for data, indication on the probability of receiving the one or more predicted requests. For example, based on the frequency and the time intervals between the one or more past requests, a prediction for one or more future requests is generated by the machine learning algorithm.

In an exemplary embodiment, the requests predictor 103 is configured to generate the information related to the one or more predicted requests by training the artificial intelligence/machine learning algorithm using as training data at least a part of the information related to the one or more past requests.

Exemplary supervised artificial intelligence/machine learning algorithms comprise, without limitation, support vector machines, linear regression algorithms, logistic regression algorithms, naive Bayes algorithms, linear discriminant analysis, decision trees, K-nearest neighbor algorithm, neural networks, and similarity learning.

The prediction service client 102-$i$ requires the predicted requests that are expected to be received with a probability value that is higher than a threshold. Accordingly, at step 204, the requests predictor 103 is configured to select among the one or more predicted requests, one or more predicted requests according to a requests selection criterion. More specifically, the requests selection criterion depends on probability values associated with the predicted requests. Accordingly, the requests predictor 103 is configured to:
- generate a probability value in association with each predicted request at step 203 such that the probability value represents the probability of receiving the predicted request at a time interval among the one or more time intervals comprised in the request for requests prediction service;
- select, at step 204, a set of predicted requests among the one or more predicted requests such that the set of predicted requests comprises one or more selected predicted requests that are associated with a probability value that is higher than a threshold among the one or more thresholds comprised in the request for requests prediction service.

In an embodiment, the requests predictor 103 is further configured to:
- generate information related to predicted data values on the basis of the information related to the past data values, at step 203, and
- select a set of predicted data values among the predicted data values at step 204, the selected set of predicted data values comprising predicted data values that exceed a data value threshold among the one or more data value thresholds.

After selecting the set of predicted requests, the requests predictor 103 sends, at step 205, a response on the request for requests prediction service such that the request comprises information related to the selected set of predicted requests.

In an embodiment, the response on the request for requests prediction further comprises information related to the selected set of predicted data values.

In an exemplary embodiment, the information related to a predicted request comprises at least one of an indication on the requesting entity 101-$i$ that is expected to send the predicted request, an indication on the future time interval during which the predicted request is expected to be received, an indication on the type of the predicted request (for example a request for raw data or a request for data analytics), the probability value associated with the predicted request, one or more parameters of the predicted request.

Upon receiving the response on the request for the requests prediction service, the prediction service client 102-$i$ is configured to perform one or more proactive actions at step 206 depending on the information related to the set of selected predicted requests.

In an embodiment, the prediction service client 102-$i$ is configured to perform one or more proactive actions at step 206 depending further on the information related to the selected set of predicted data values.

In an embodiment, the one or more proactive actions comprise triggering data collection from one or more data sources 104-$j$. For example, if the information related to the set of selected predicted requests and/or the information related to the selected set of predicted data values indicate that a data service request is to be received within a short future time interval with a high probability, the prediction service client 102-$i$ may trigger collecting the data that need to be available for performing the tasks related to the future requested data service.

In this embodiment, the prediction service client 102-$i$ sends a request for data to one or more data sources 104-$j$ at step 207 and receives, at step 208, a response on the request for data, the response comprising the required data.

In an embodiment in which the predicted request relates to an artificial intelligence/machine learning-based service for which the prediction service client 102-$i$ is configured to generate processed data using an artificial intelligence/machine learning algorithm, the one or more proactive actions comprise training an artificial intelligence/machine learning model. For example, the processed data is analytics data produced by the prediction service client 102-$i$ using an artificial intelligence/machine learning algorithm.

In an embodiment, the one or more proactive actions comprise triggering data collection from the one or more data sources 104-$i$ and training of the artificial intelligence/machine learning model using as training data the data collected from the one or more data sources 104-$j$.

At the end of step 206, the prediction service client 102-$i$ knows at which future time interval it is expected to receive a data service request from the requesting entity 101-$i$ and has prepared the resources that it will need to provide the requested data service including the data that need to be collected and that has been collected proactively.

At step 209, the prediction service client 102-$i$ receives effectively a request for a data service (as predicted by the requests predictor 103) from the requesting entity 101-$i$.

At step 210, the prediction service client 102-$i$ performs one or more tasks to provide the requested service to the requesting entity 101-$i$. Since the resources are ready for use, the time required to perform the one or more tasks is reduced compared with the scenarios in which the prediction service client 102-$i$ has to perform data collection in addition to performing the one or more tasks.

For example, in an embodiment in which the request for a data service relates to artificial intelligence/machine-learning-based service that requires the training of an artificial intelligence/machine learning model, the prediction service client 102-$i$ has only to run the artificial intelligence/machine learning model at step 210 to provide the requested service, since the artificial intelligence/machine learning model has been already trained at step 206 with the proactive collection of training data and the proactive training.

At step 213, the prediction service client 102-$i$ sends a response on the request for the data service to the requesting entity 101-$i$.

The request for the data service sent to the prediction service client 102-$i$ at step 209 is now recorded as a past request and needs to be stored in the requests storage entity 105. Accordingly, the prediction service client 102-$i$ is configured, at steps 211 and 212 to request the storage of the data service request in the requests storage entity 105.

The storage request may be sent regularly, for example after receiving a given number of requests, or periodically, for example at periodic time intervals.

At step 211, the prediction service client 102-$i$ sends a storage request to the requests storage entity 105 asking for storing the information related to the data service request.

In an embodiment, the storage request comprises information enabling a unique identification of the stored data service request.

At step 212, the requests storage entity 105 sends a response on the storage request to the prediction service client 102-$i$.

At step 214, the prediction service client 102-$i$ de-activates the requests prediction service from the requests predictor 103.

Figure 3:
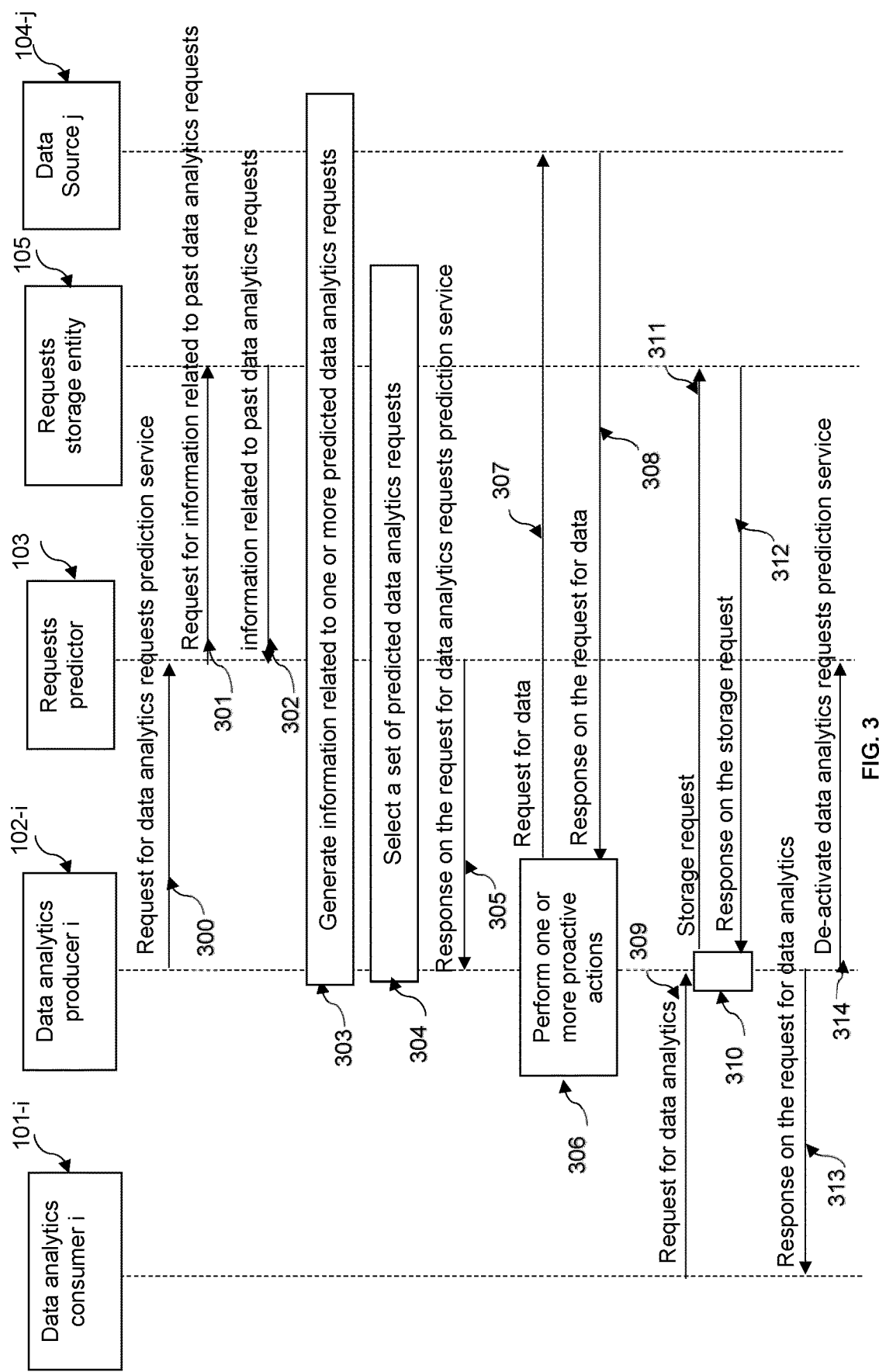
FIG. 3 is a connection flow illustrating an exemplary implementation of a requests prediction service, according to some embodiments to provide predictions on requests for data analytics.

FIG. 3 is a connection flow illustrating an exemplary implementation of the requests prediction service, according to some embodiments in which the data service request is a data analytics request sent by a data analytics consumer 101-$i$ (which is the requesting entity) to a data analytics producer 102-$i$ (which is the prediction service client).

In this exemplary implementation the data analytics producer 102-$i$ activates a data analytics requests prediction service from the requests predictor 103 to have a prediction on the incoming data analytics requests it is expected to receive from the data analytics consumer 101-$i$ at one or more future time intervals with a probability that is higher than a probability threshold.

In an exemplary embodiment, the data analytics producer 102-$i$ uses an artificial intelligence/machine learning algorithm to produce the data analytics from input data. In this embodiment, the data analytics producer 102-$i$ activates the data analytics requests prediction service from the requests predictor 103 in order to proactively collect the training data required for training the artificial intelligence/machine learning algorithm. The data analytics producer 102-$i$ uses the proactively collected data to proactively train the artificial intelligence/machine learning algorithm. By doing so, the artificial intelligence/machine learning algorithm will be ready and available for producing the data analytics when the data analytics producer 102-$i$ receives effectively a request for data analytics from the data analytics consumer 101-$i$.

At step 300, the data analytics producer 102-$i$ triggers the requests prediction service from the requests predictor 103 by sending a request for a data analytics requests prediction service. The data analytics producer 102-*i* triggers the requests prediction service to anticipate one or more future data analytics requests it is expected to receive at one or more future time intervals from the data analytics consumer 101-*i* with a probability higher than a threshold.

Accordingly, the request for data analytics requests prediction service comprises one or more probability thresholds and one or more future time intervals to specify to the requests predictor 103 that the requested predictions concern:

the data analytics consumer 101-*i*;

the future incoming data analytics requests that are expected to be received from the data analytics consumer 101-*i* at the one or more future time intervals;

the future incoming data service requests that are expected to be received from the data analytics consumer 101-*i* with a probability value that is higher than a probability threshold among the one or more probability thresholds.

The request for data analytics requests prediction service may comprise an information enabling a unique identification of the data analytics consumer 101-*i*. For example, the information comprises a unique identifier associated with the data analytics consumer 101-*i*.

In this embodiment, the request for data analytics requests prediction service further comprises one or more data analytics value thresholds to specify to the requests predictor 103 that data analytics values predictions concern the data analytics values that exceed a data value threshold among the one or more data value thresholds.

Upon receiving the request for data analytics requests prediction service, the requests predictor 103 retrieves, from the requests storage entity 105, information related to the past data analytics requests received in the telecommunication network 100 at one or more previous time intervals. To do so, the requests predictor 103 sends, at step 301, a request for information related to past data analytics requests to the requests storage entity 105 and receives, at step 302, information related to one or more past data analytics requests received in the telecommunication network 100.

In an embodiment, the requests predictor 103 retrieves, from the requests storage entity 105, information related to the past data analytics requests received at one or more previous time intervals by the data analytics consumer 101-*i*. In this embodiment, the request for information related to past data requests comprises the unique identifier associated with the data analytics consumer 101-*i* to specify to the requests storage entity 105 that the past data analytics requests correspond to the data analytics requests that have been previously received by the data analytics consumer 101-*i*.

In an embodiment, the request for information related to past data analytics requests comprises a request for information related to past data analytics values. In this embodiment, the requests predictor 103 receives, at step 302, information related to past data analytics values.

In an exemplary embodiment, the information related to a past request comprises at least one of an indication on the data analytics consumer 101-*i* that has sent the past data analytics request, an indication of the data analytics producer 102-*i* that has received the past request, an indication on the past time interval during which the past data analytics request has been received, and an indication on the type of the past data analytics requests (e.g. reports, events, notifications), one or more parameters of a past request, one or more parameters of a target entity having received and processed the past request.

At step 303, the requests predictor 103 generates information related to one or more predicted data analytics requests on the basis of the information related to the one or more past data analytics requests. A predicted data analytics request corresponds to a data analytics request that is expected to be received by the data analytics producer 102-*i* from the data analytics consumer 101-*i*, at a future time interval among the one or more future time intervals comprised in the request for data analytics requests prediction service.

In an exemplary embodiment, the requests predictor 103 is configured to generate the information related to the one or more predicted data analytics requests by processing the information related to the one or more past data analytics requests using an artificial intelligence/machine learning algorithm.

In an exemplary embodiment, the requests predictor 103 is configured to generate the information related to the one or more predicted data analytics requests by training the artificial intelligence/machine learning algorithm using as training data at least a part of the information related to the one or more past data analytics requests.

At step 304, the requests predictor 103 is configured to select among the one or more predicted data analytics requests, one or more predicted data analytics requests according to a requests selection criterion. More specifically, the requests selection criterion depends on probability values associated with the predicted data analytics requests. Accordingly, the requests predictor 103 is configured to:

generate a probability value in association with each predicted data analytics request such that the probability value represents the probability of receiving the predicted data analytics request at a time interval among the one or more time intervals comprised in the request for requests prediction service;

select a set of predicted data analytics requests among the one or more predicted requests such that the set of predicted requests comprises one or more selected predicted data analytics requests that are associated with a probability value that is higher than a threshold among the one or more thresholds comprised in the request for requests prediction service.

In an embodiment, the requests predictor 103 is further configured to:

generate information related to predicted data analytics values on the basis of the information related to the past data analytics values, and select a set of predicted data analytics values among the predicted data analytics values, the selected set of predicted data analytics values comprising predicted data analytics values that exceed a data analytics value threshold among the one or more data analytics value thresholds.

After selecting the set of predicted data analytics requests, the requests predictor 103 sends, at step 305, a response on the request for data analytics requests prediction service to the data analytics producer 102-*i* such that the request comprises information related to the selected set of predicted data analytics requests.

In an embodiment, the response on the request for data analytics requests prediction further comprises information related to the selected set of predicted data analytics values.

In an exemplary embodiment, the information related to a predicted data analytics request comprises at least one of an indication on the data analytics consumer 101-$i$ that is expected to send the predicted data analytics request, an indication on the future time interval during which the predicted data analytics request is expected to be received, an indication on the type of the predicted data analytics request, and the probability value associated with the predicted data analytics request, one or more parameters of the predicted request.

Upon receiving the response on the request for the data analytics requests prediction service, the data analytics producer 102-$i$ is configured to perform one or more proactive actions at step 306 depending on the information related to the set of selected predicted requests.

In an embodiment, the data analytics producer 102-$i$ is configured to perform one or more proactive actions at step 306 depending further on the information related to the selected set of predicted data analytics values.

In an embodiment, the one or more proactive actions comprise triggering data collection from one or more data sources 104-$j$. For example, if the information related to the set of selected predicted data analytics requests and/or the information related to the selected set of predicted data analytics values indicate that a data analytics request is to be received within a short future time interval with a high probability, the data analytics producer 102-$i$ may trigger collecting the data that need to be available for performing the tasks related to producing the future requested data analytics.

In this embodiment, the data analytics producer 102-$i$ sends a request for data to one or more data sources 104-$j$ at step 307 and receives, at step 308, a response on the request for data, the response comprising the required data.

In an embodiment in which the data analytics producer 102-$i$ uses artificial intelligence/machine learning algorithms and models to produce data analytics, the one or more proactive actions comprise proactive training of one or more artificial intelligence/machine learning models.

In this embodiment, the one or more proactive actions further comprise proactive collection of input data from the one or more data sources 104-$j$ and training the one or more artificial intelligence/machine learning models using as training data the input data collected from the one or more data sources 104-$j$.

At the end of step 306, the data analytics producer 102-$i$ knows at which future time interval it is expected to receive a data analytics request from the data analytics consumer 101-$i$ and has prepared the resources that it will need to provide the requested data analytics.

At step 309, the data analytics producer 102-$i$ receives effectively a request for data analytics service from the data analytics consumer 101-$i$.

At step 310, the data analytics producer 102-$i$ performs one or more tasks to provide the requested data analytics to the data analytics consumer 101-$i$. Since the resources are ready for use, the time required to perform the one or more tasks is reduced compared with the scenarios in which the data analytics producer 102-$i$ has to perform data collection in addition to performing the one or more tasks.

For example, in an embodiment in which the data analytics producer 102-$i$ uses artificial intelligence/machine learning models and algorithms to produce data analytics, the one or more tasks comprise collecting data from one or more data sources 104-$j$ to run the already trained artificial intelligence/machine learning models and producing the required data analytics.

At step 313, the data analytics producer 102-$i$ sends a response on the request for data analytics to the data analytics consumer 101-$i$, the response comprising the required data analytics.

The request for data analytics sent to the data analytics producer 102-$i$ at step 309 is now recorded as a past data analytics request and needs to be stored in the requests storage entity 105. Accordingly, the data analytics producer 102-$i$ is configured, at steps 311 and 312 to request the storage of the data analytics request in the requests storage entity 105.

The storage request may be sent regularly, for example after receiving a given number of data analytics requests, or periodically, for example at periodic time intervals or immediately after receiving request for data analytics.

At step 311, the data analytics producer 102-$i$ sends a storage request to the requests storage entity 105 asking for storing the information related to the data analytics request.

In an embodiment, the storage request comprises, in addition to the request to be stored, information related to the stored data analytics. For example, the storage request comprises a data analytics identifier associated with the data analytics (denoted by Analytics ID) and/or an Area of Interest (AOI).

At step 312, the requests storage entity 105 sends a response on the storage request to the data analytics producer 102-$i$.

At step 314, the data analytics producer 102-$i$ de-activates the data analytics requests prediction service from the requests predictor 103.

The exemplary implementation illustrated in FIG. 3 may be used in several applications in telecommunication networks.

A first exemplary application relates to the production of data analytics to provide channel state information in a wireless communication network. In this application, the data analytics consumer 101-$i$ may be implemented as a part of a transmitter device and the data analytics producer 102-$i$ and the requests predictor 103 may be implemented as parts of a receiver device. The transmitter device requires channel state information from the receiver device, for example to perform adaptive channel coding or adaptive modulation based on the channel quality. The receiver device produces data analytics on the channel statistics and requires the data analytics requests prediction service to anticipate the requests for data analytics (for channel state information) from the transmitter device. The requests storage entity 105 may be implemented in a network management entity/device. The data sources 104-$j$ may be any entity operable in the telecommunication network and having access for example to data such as signal-to-noise ratio measurements and channel fading coefficients.

A second exemplary application relates to the production of data analytics in 5G and beyond networks in which softwarization and/or virtualization of network entities is used.

Softwarization refers to the process where a given functionality runs in software instead of hardware.

Virtualization refers to the process of creating virtual instances of hardware platforms, operating systems, storage devices, and computing network resources. Network Virtualization technologies extend virtualization to the network infrastructure including the core network, the access network and the transport network. In particular, Network Functions Virtualization (NFV) extends virtualization to the network functions.

In 5G and beyond networks, data analytics mechanisms are introduced to provide efficient processing of data generated by the different network entities. In particular, data analytics introduced in 5G and beyond networks implement AI/ML algorithms and models.

In a first exemplary application to 5G and beyond networks, the data analytics producer 102-$i$ is implemented in or is a management data analytics function or service defined in current 3GPP standards. The MDAF and MDAS are management entities configured to provide management data analytics to support network management and orchestration at the Radio Access Network level or at the Core Network level.

The management data analytics function/service is deployed at the management plane, designating an area of operations of the telecommunication network 100 carrying administrative traffic.

In this first exemplary application, the data analytics consumer 101-$i$ requires data analytics from the data analytics producer 102-$i$ to perform one or more actions that concern several management tasks comprising, without limitation, mobility management, session Management, Quality of Service (QoS) management, Application layer, security management, life cycle management, network performance management.

In an embodiment, the data analytics producer 102-$i$ is or is implemented as a part of an MDAF or an MDAS for producing management data analytics from management data collected from the one or more data sources 104-$j$. Exemplary data sources 104-$j$ in this application comprise, without limitations, user equipments, base stations, control station, radio access network nodes, OAM entities, and Cloud Network Functions (CNF).

In an embodiment, the requests predictor 103 is implemented as a part of the MDAF or the MDAS.

In an embodiment, the requests storage entity 105 is implemented as a part of the MDAF or the MDAS in which is implemented the requests predictor 103.

In an exemplary embodiment, the management function is a virtualized management function corresponding to a management functionality deployed on the access network, the transport network, or the core network.

Figure 4:
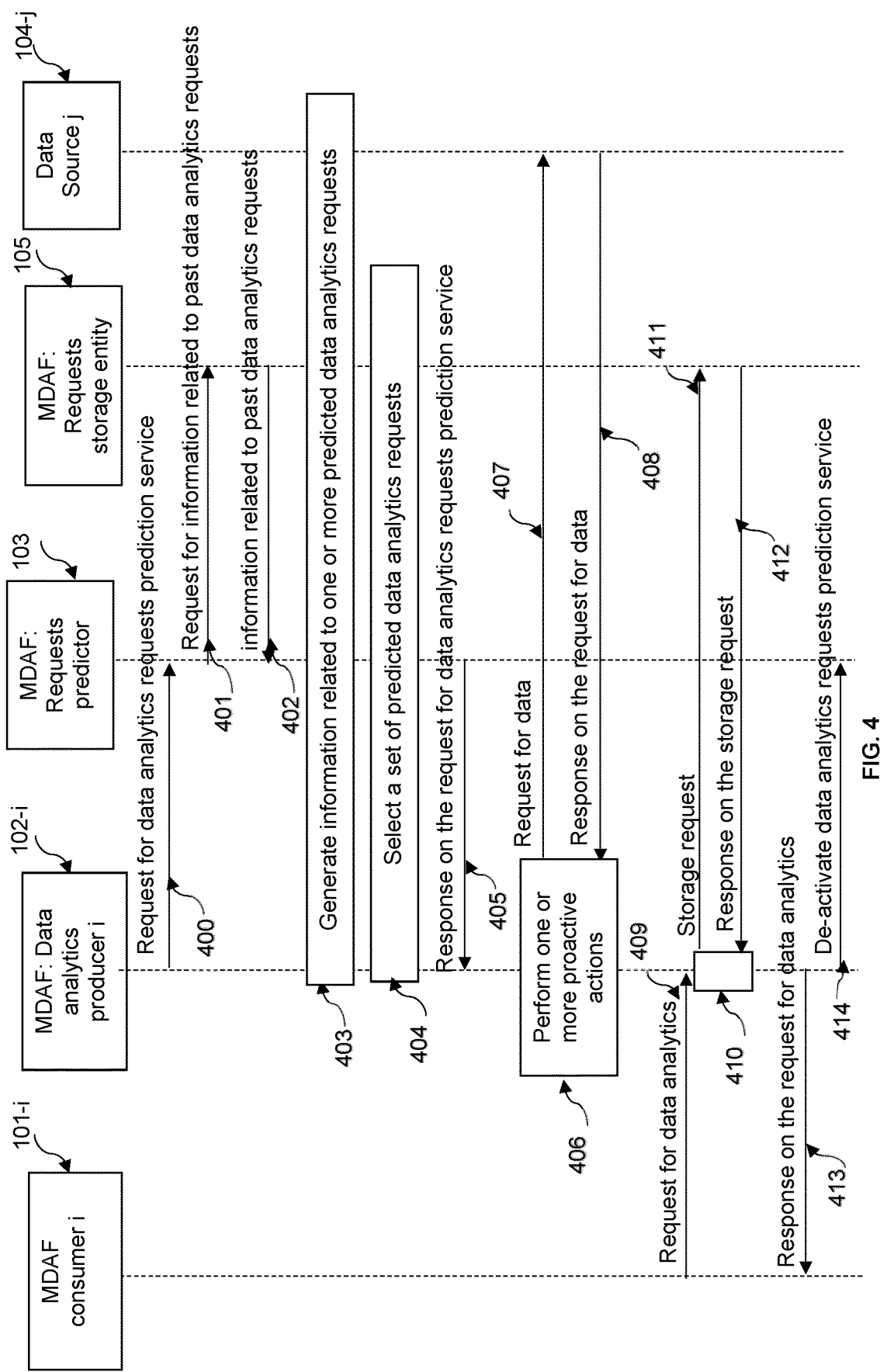
FIG. 4 is a connection flow illustrating a first exemplary application to 5G and beyond networks, according to some embodiments.

FIG. 4 is a connection flow illustrating the first exemplary application to 5G and beyond networks, according to some embodiments. In these embodiments:
- the data analytics consumer 101-$i$ is implemented as a part of a management data analytics function (MDAF) consumer;
- the data analytics producer 102-$i$ is implemented as a part of the MDAF;
- the requests predictor 103 is implemented as a part of the MDAF;
- the requests storage entity 105 is implemented as a part of the MDAF.

The steps 400 to 414 are identical to the steps 300 to 314 detailed in relation with the description of FIG. 3. In addition to these steps, step 400 may be preceded by discovery and selection procedures performed before establishing any communication link between the entities in the telecommunication network 100. For example, MDAF consumer 101-$i$ may perform discovery and selection procedures to select the data analytics producer 102-$i$ that supports the requested data analytics service and the required data analytics production capabilities. Similarly, the data analytics producer 102-$i$ may perform discovery and selection procedures to select the requests predictor 103 that supports the required requests prediction service.

In an embodiment, the discovery and selection procedures may comprise authentication steps for example to authenticate the MDAF consumer 101-$i$ and/or to authenticate the data analytics producer 102-$i$.

In a second exemplary application to 5G and beyond networks, the data analytics producer 102-$i$ is implemented in or is a Network Data Analytics Function (NWDAF) defined in current 3GPP standards. The NWDAF is a network entity configured to provide network data analytics from network data collected from the one or more data sources 104-$j$. Exemplary data sources 104-$j$ in this application comprise, without limitations, user equipments, base stations, control station, radio access network nodes, OAM entities, and Cloud Network Functions (CNF).

The NWDAF is deployed at the control plane, designating an area of operations of the telecommunication network 100 carrying signaling traffic.

In this second exemplary application, the data analytics consumer 101-$i$ may be or may be implemented as a part of a NWDAF consumer or an Operation, Administration and Management (OAM) entity.

In an embodiment, the requests predictor 103 is implemented or is a network data analytics function that is different from the NWDAF in which is implemented the data analytics producer 102-$i$.

In an embodiment, the requests storage entity 105 is implemented as a part of an Analytics Data Repository Function (ADRF).

In an embodiment, the NWDAF is a virtualized network function corresponding to a network functionality deployed on the access network, the transport network, or the core network of the telecommunication network 100. Exemplary virtualized network functions comprise, without limitation:
- user plane functions;
- Policy control functions;
- authentication server functions;
- Unified data management functions;
- network exposure functions;
- network repository functions;
- network slice selection functions.

Figure 5:
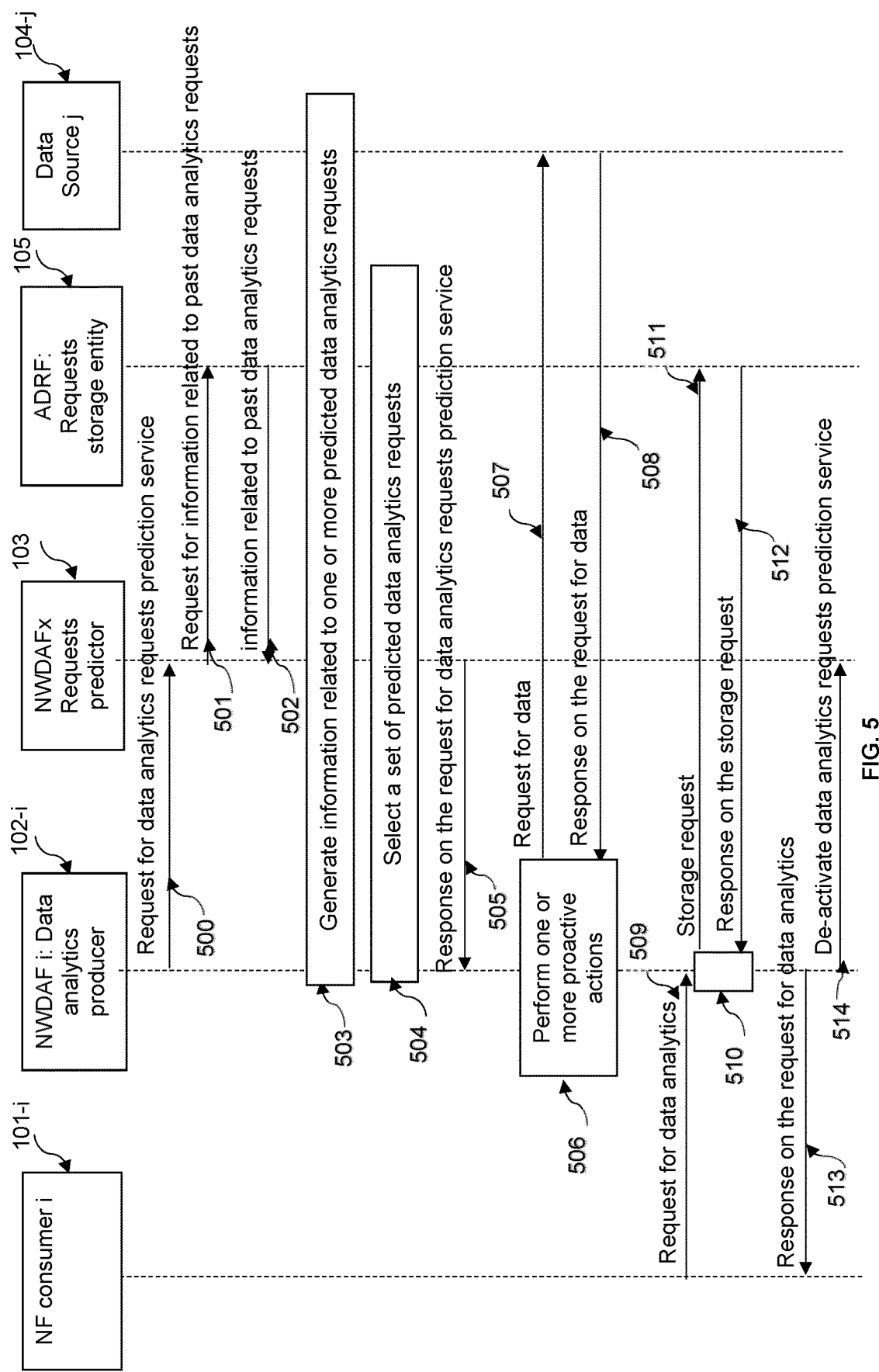
FIG. 5 is a connection flow illustrating a second exemplary application to 5G and beyond networks, according to some embodiments.

FIG. 5 is a connection flow illustrating the second exemplary application to 5G and beyond networks, according to some embodiments. In these embodiments:
- the data analytics consumer 101-$i$ is implemented as a part of a Network Function (NF) consumer;
- the data analytics producer 102-$i$ is implemented as a part of a first NWDAF denoted by NWDAF i;
- the requests predictor 103 is implemented as a part of a second NWDAF denoted by NWDAFx, and
- the requests storage entity 105 is implemented as a part of the ADRF.

The steps 500 to 514 are identical to the steps 300 to 314 detailed in relation with the description of FIG. 3. In addition to these steps, step 500 may be preceded by discovery and selection procedures performed before establishing any communication link between the entities in the telecommunication network 100. For example, the NF consumer 101-$i$ may perform discovery and selection procedures to select the NWDAF i and the data analytics producer 102-$i$ that supports the requested data analytics service and the required data analytics production capabilities. Similarly, the data analytics producer 102-$i$ may perform discovery and selection procedures to select the NWDAFx and the requests predictor 103 that supports the required requests prediction service.

In an embodiment, the discovery and selection procedures may comprise authentication steps for example to authenticate the NF consumer 101-*i* and/or to authenticate the NWDAF1.

Figure 6:
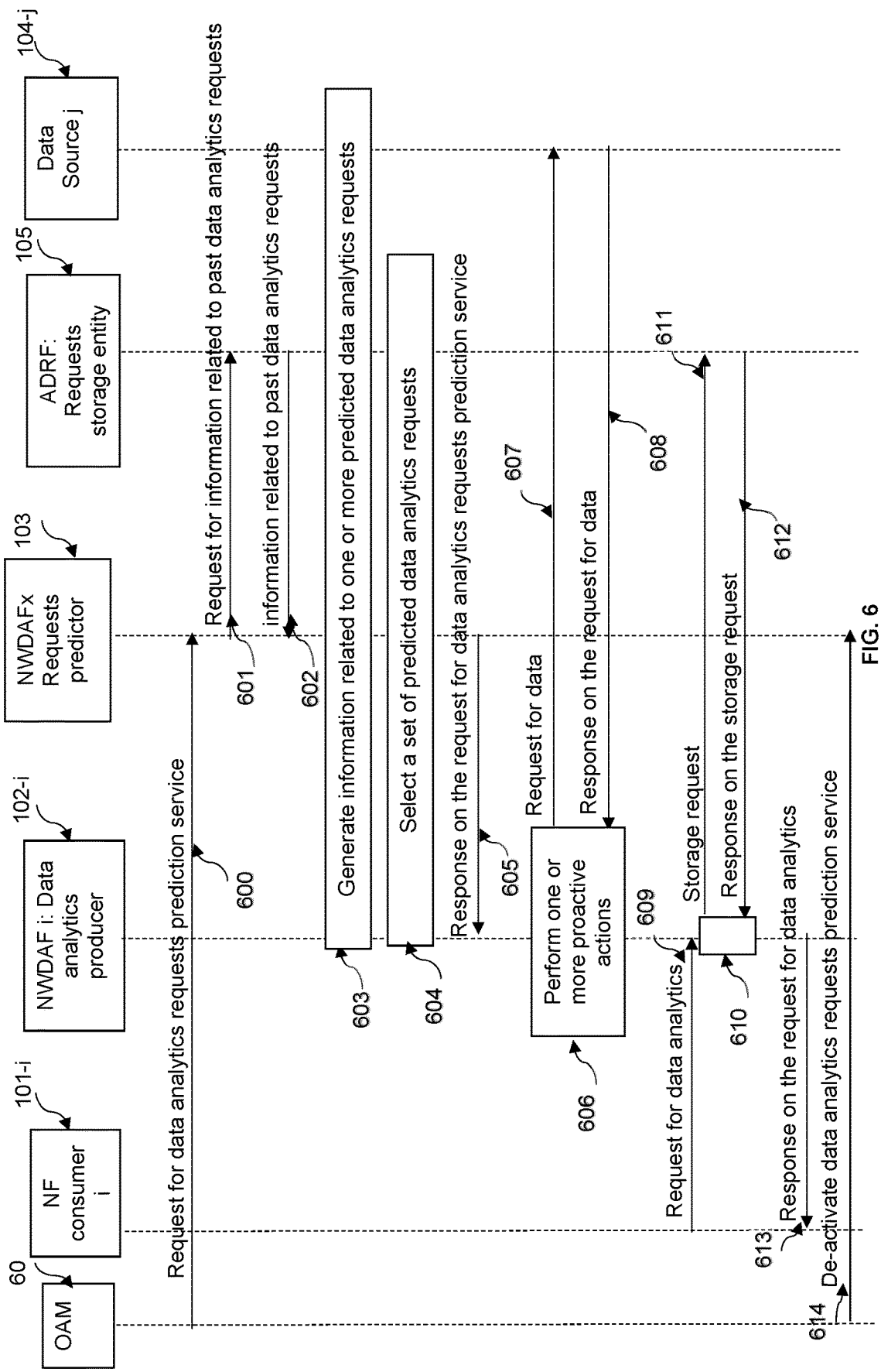
FIG. 6 is a connection flow illustrating the second exemplary application to 5G and beyond networks, according to some embodiments in which the requests prediction service is activated by an Operation, Administration, and Management (OAM) entity.

FIG. 6 is a connection flow illustrating the second exemplary application to 5G and beyond networks, according to some embodiments. In these embodiments:
- the requests prediction service is activated and de-activated by an OAM entity 60;
- the data analytics consumer 101-*i* is implemented as a part of NF consumer 101-*i*;
- the data analytics producer 102-*i* is implemented as a part of a first NWDAF, NWDAF i;
- the requests predictor 103 is implemented as a part of a second NWDAF, NWDAFx, and
- the requests storage entity 105 is implemented as a part of the ADRF.

Steps 600 to 614 are similar to steps 300 to 314 detailed in relation with the description of FIG. 3 except that the requests prediction service is activated and de-activated by the OAM entity 60 and not by the data analytics producer 102-*i*.

Accordingly, the request for data analytics requests prediction service is sent at step 600 from the OAM entity 60 to the requests predictor 103.

As the request for the data analytics requests prediction service is not sent by the data analytics producer 102-*i*, the OAM entity 60 has to specify in the request which data analytics producing entity is concerned with the requests prediction service. Accordingly, the request for data analytics requests prediction service may comprise information enabling a unique identification of the network data analytics function concerned with the requests prediction service, this entity will receive the response on the request for data analytics requests prediction service at step 605 from the requests predictor 103. For example, the information is a network function identifier (denoted by NF ID) associated with the network data analytics function.

In an embodiment, the request for information related to past data analytics requests sent in step 601 from the requests predictor 103 to the requests storage entity 105 further comprises the information enabling the identification of the network data analytics function (NWDAF i) (in general the information enabling the identification of the data analytics producer 102-*i*).

Similarly, the storage request sent in step 611 to store the request for data analytics received by the NWDAF i may further comprise the information enabling the identification of the network data analytics function 1 (NWDAF i).

The OAM entity 60 de-activates the data analytics requests prediction service from the requests predictor at step 614.

Figure 7:
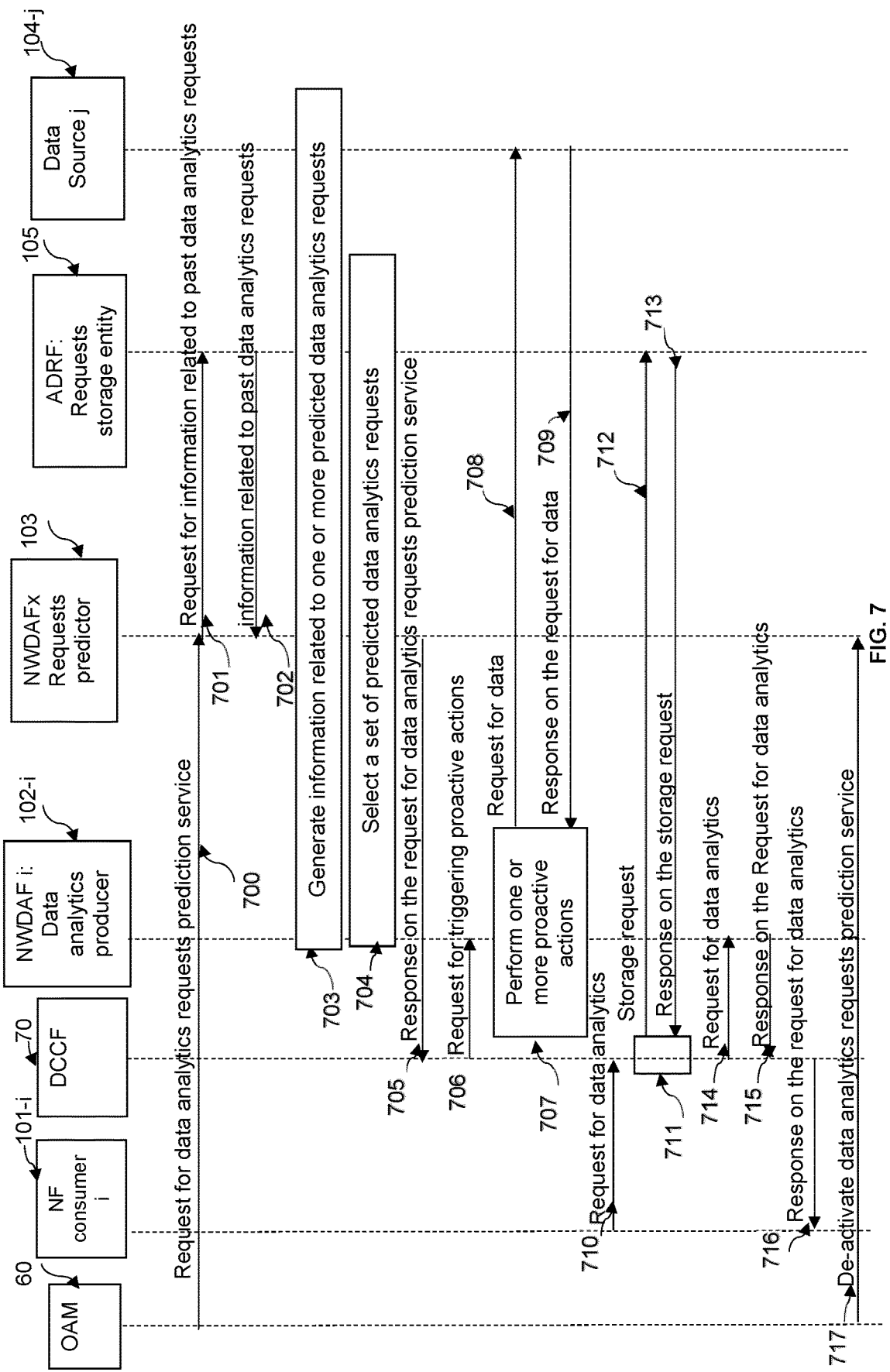
FIG. 7 is a connection flow illustrating the second exemplary application to 5G and beyond networks, according to some embodiments in which the requests prediction service is activated by an OAM entity and the requests for data analytics are managed by a data collection and coordination function.

FIG. 7 is a connection flow illustrating the second exemplary application to 5G and beyond networks, according to some embodiments. In these embodiments:
- the requests prediction service is activated and de-activated by an OAM entity 60;
- the data analytics consumer 101-*i* is implemented as a part of NF consumer 101-*i*;
- the data analytics producer 102-*i* is implemented as a part of a first NWDAF, NWDAF i;
- the requests predictor 103 is implemented as a part of a second NWDAF, NWDAFx;
- the requests storage entity 105 is implemented as a part of the ADRF, and
- a data collection and coordination function (DCCF) 70 acts as an intermediate entity between the NF consumer 101-*i* and the data analytics producer 102-*i* to manage the operations related to the triggering of proactive actions and, the storage of data analytics requests, and the reception of data analytics requests.

Accordingly, the OAM entity 60 activates the data analytics requests prediction service from the requests predictor 103 at step 700.

Steps 701 to 704 are similar to steps 300 to 304 described in relation with FIG. 3.

In the embodiments illustrated through FIG. 7, the management of the predicted data analytics requests is performed in a centralized way at the DCCF 70. Accordingly, the requests predictor 103 sends, at step 705, the response on the request for data analytics prediction service to the DCCF 70 instead of the data analytics producer 102-*i*. It is then the role of the DCCF 70 to request, from the data analytics producer 102-*i*, the triggering of one or more proactive actions depending on the request for data analytics prediction service. Accordingly, the DCCF 70 sends, at step 707, a request for triggering proactive actions to the data analytics producer 102-*i*.

At steps 707 to 709, the data analytics producer 102-*i* performs one or more proactive actions according to any preceding feature described in relation with FIG. 3.

At step 710, the DCCF 70 receives a request for data analytics from the NF consumer 101-*i*.

At steps 711 to 713, the DCCF 70 manages the operations required to store the received request for data analytics in the requests storage entity 105 according to any preceding feature described in relation with the storage of requests in FIG. 3.

At step 714, the DCCF 70 forwards the request for data analytics to the data analytics producer 102-*i*. Upon receiving the request, the data analytics producer 102-*i* performs the tasks required for producing the required data analytics.

At step 715, the DCCF 70 receives a response on the request for data analytics from the data analytics producer 102-*i*.

At step 716, the DCCF forwards the response on the requests for data analytics to the NF consumer 101-*i*.

The OAM entity 60 de-activates the data analytics requests prediction service from the requests predictor 103 at step 717.

It should be appreciated by those skilled in the art that any functions, engines, block diagrams, flow diagrams, state transition diagrams and/or flowcharts herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or apparatus, whether such computer or processor is explicitly shown.

Each described computation function, block, step can be implemented in hardware, software, firmware, middleware, microcode, or any suitable combination thereof. If implemented in software, the computation functions, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable apparatus, create the means for implementing the functions described herein.

When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause an apparatus to perform the necessary tasks. Additionally, the processor, memory and example algorithms, encoded as computer program code, serve as means for providing or causing performance of operations discussed herein.

For example, the functions described here for the requests predictor may be performed by a corresponding apparatus (referred to as a 'requests prediction apparatus'). For example, the functions described here for the requests prediction service client may be performed by a corresponding apparatus (referred to as a 'prediction service client apparatus').

In the present description, block denoted as "means configured to" perform a certain function or "means for" performing a certain function shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used in this application, the term "circuit" or "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
 (c) hardware circuit(s) and or processor(s), such as a microprocessor(s) or a portion of a microprocessor(s), that requires software (e.g., firmware) for operation, but the software may not be present when it is not needed for operation."

This definition of "circuit" or "circuitry" applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device. The term circuitry may cover digital signal processor (DSP) hardware, network processor, application specific integrated circuit (ASIC), field programmable gate array (FPGA), etc.

The "circuit" or "circuitry" may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The "circuit" or "circuitry" may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via a radio network (e.g., after being down-converted by radio transceiver, for example).

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

The methods and devices described herein may be implemented by various means. For example, these techniques may be implemented in hardware, software, or a combination thereof. For a hardware implementation, the processing elements of the different network elements operating in the telecommunication network 100 can be implemented for example according to a hardware-only configuration (for example in one or more FPGA, ASIC, or VLSI integrated circuits with the corresponding memory) or according to a configuration using both VLSI and Digital Signal Processor (DSP).

Figure 8:
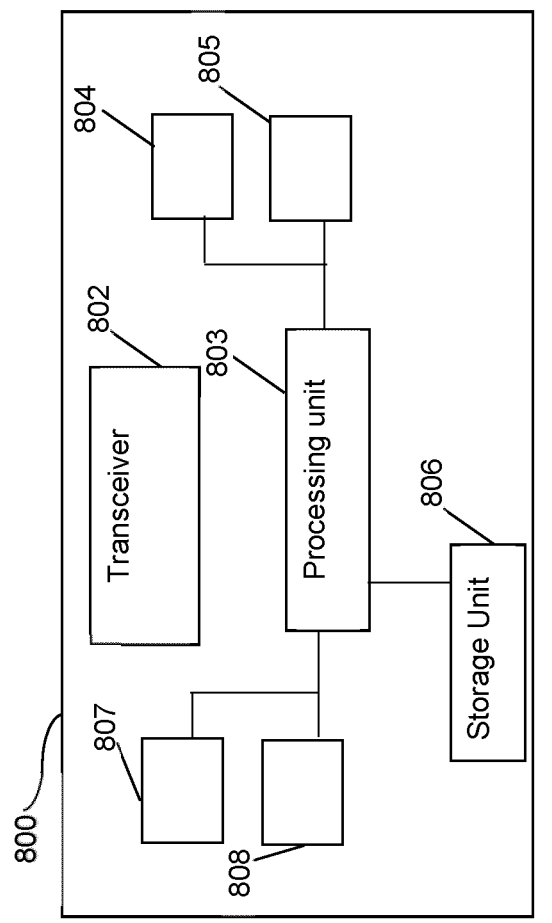
FIG. 8 is a block diagram illustrating an exemplary structure of a network entity operating in the telecommunication network, according to some embodiments.

FIG. 8 is a block diagram representing an exemplary hardware/software architecture of a network entity 800 operating in the telecommunication network 100 such as the network data sources 104-*j*, the requesting entities 101-*i*, the prediction service clients 102-*i*, and the requests predictor 103, according to some embodiments. As illustrated, the architecture may include various computing, processing, storage, communication, and displaying units comprising:
 communication circuitry comprising a transceiver 802 (e.g. wireless or optical transceiver) configured to connect the network entity 800 to corresponding links in the telecommunication network 100, and to ensure transmission/reception of data and/or signals. The communication circuitry may support various network and air interface such as wired, optical fiber, and wireless networks;

a processing unit 803 configured to execute the computer-executable instructions to run the methods and algorithms according to the various embodiments and perform the various required functions of the network entity such as data analytics production, ML models training and processing, and any functionalities required to enable the network entity 800 to operate in the telecommunication network 100 according to the various embodiments. The processing unit 802 may be a general purpose processor, a special purpose processor, a DSP, a plurality of microprocessors, a controller, a microcontroller, an ASIC, an FPGA circuit, any type of integrated circuit, and the like;

a power source 804 that may be any suitable device providing power to the network entity 800 such as dry cell batteries, solar cells, and fuel cells;

a localization unit 805 such as a GPS chipset implemented in applications that require information indicating the location of the network entity 800;

a storage unit 806 possibly comprising a random access memory (RAM) or a read-only memory used to store data (e.g. data provided by the data sources 104-*j*, the requests for data services) and any data required to perform the functionalities of the network entity 800 according to the embodiments;

Input peripherals 807;

Output peripherals 808 comprising communication means such as displays enabling for example man-to-machine interaction between the network entity 800 and the telecommunication network 100 administrator for example for configuration and/or maintenance purposes.

The architecture of the device 800 may further comprise one or more software and/or hardware units configured to provide additional features, functionalities and/or network connectivity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

For example, the program comprises instructions stored on the computer-readable storage medium that, when executed by a processor, cause the processor to:

generate information related to one or more predicted requests on the basis of information related to one or more past requests;

send information related to at least one predicted data service request to a requests prediction service client.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A requests prediction apparatus implemented as a Network Data Analytics Function (NWDAF) in a 5G telecommunication network, the requests prediction apparatus comprising:

at least one processor; and at least one memory storing instructions that, when executed by the at least one processor, cause the requests prediction apparatus at least to perform:

receiving, from a requests prediction service client, a request for a requests prediction service, wherein the request for comprises:

one or more probability thresholds, and one or more future time intervals;

upon receiving the request, retrieving, from a requests storage entity implemented as an analytics data repository function, information related to one or more past data service requests comprising network data including channel state measurements, quality of service measurements, and user equipment measurements;

training an artificial intelligence or a machine learning algorithm based on the retrieved information;

generating information related to one or more predicted data service requests based on the trained artificial intelligence or machine learning algorithm, wherein the information related to one or more predicted data service requests includes a probability value for each predicted data service request of the one or more predicted data service requests, wherein the probability value represents a probability of receiving the predicted data service request at a future time interval of the one or more future time intervals, and wherein each of the one or more predicted data service requests comprises:

an indication of a requesting network function expected to send the predicted data service request, and a type of the predicted data service request;

selecting, from the one or more predicted data service requests, at least one predicted data service request comprising: an associated probability value higher than a probability threshold of the one or more probability thresholds, and a predicted data value exceeding a data value threshold; and sending, to the requests prediction service client, a response to the request for the requests prediction service, wherein the response comprises the at least one selected predicted data service request together with trigger information for enabling the prediction service client to perform proactive data collection or proactive training of an artificial intelligence model prior to receiving the predicted data service request.

2. The requests prediction apparatus of claim 1, wherein the one or more past data service requests correspond to one or more requests received, at one or more previous time intervals, by the requests prediction service client, and the one or more predicted data service requests correspond to one or more requests expected to be received, at the future time interval, by the requests prediction service client.

3. The requests prediction apparatus of claim 2, wherein the at least one memory and the instructions, when executed by the at least one processor, further cause the requests prediction apparatus at least to perform:
generating one or more predicted values based on data obtained using the one or more past data service requests;
determining whether one or more trigger criteria are met based on the one or more predicted values; and
sending, to the requests prediction service client, trigger information including information related to the data for which the one or more trigger criteria are met.

4. The requests prediction apparatus of claim 3, wherein the information related to the at least one predicted data service request further comprises a parameter of the at least one predicted data service request.

5. The requests prediction apparatus according to claim 4, wherein the information related to each of the one or more past data service requests comprises:
an indication of the requesting entity that has sent the past data service request,
an indication on a past time interval during which the past data service request was received,
an indication on the type of the past data service request, and
a parameter of the past data service request.

6. A prediction service client apparatus implemented as a Network Function (NF) in a 5G telecommunication network, the prediction service client apparatus comprising:
at least one processor; and
at least one memory storing instructions that, when executed by the at least one processor, cause the prediction service client apparatus at least to perform:
sending, to a requests predictor implemented as a network data analytics function, a request for a requests prediction service, wherein the request comprises:
a unique identifier of the network function;
one or more probability thresholds, and
one or more future time intervals;
receiving, from the requests predictor, a response to the request for the requests prediction service, the response comprising information related to at least one predicted data service request, wherein the information related to the at least one predicted data service request comprises at least one of:
an indication of a requesting entity expected to send the predicted data service request;
a type of the predicted data service request; and
a probability value associated with the predicted data service request;
triggering, based on trigger information including the information related to the at least one predicted data service request, proactive actions comprising:
proactive data collection of telecom network data comprising channel state measurements, quality of service measurements, and user equipment measurements from one or more data sources, and
proactive training of an artificial intelligence or machine learning model using the proactively collected telecom network data, prior to receiving the predicted data service request; and
wherein the triggering information indicates that a probability value and a predicted data value exceed respective thresholds.

7. The prediction service client apparatus of claim 6, wherein the at least one memory and the instructions, when executed by the at least one processor, further cause the prediction service client apparatus at least to perform:
receiving, from the requests predictor, the trigger information indicating that one or more trigger criteria based on predicted values are met, wherein the predicted values are generated based on values of data obtained using the one or more past data service requests.

8. The prediction service client apparatus of claim 7, wherein the information related to the at least one predicted data service request further comprises:
a probability value associated with the at least one predicted data service request, and
a parameter of the at least one predicted data service request.

9. The prediction service client apparatus of claim 6, wherein information related to each of the past data service requests comprises:
an indication of the requesting entity that has sent the past data service request,
an indication on a past time interval during which the past data service request was received,
an indication on the type of the past data service request, and
a parameter of the past data service request.

* * * * *